United States Patent [19]
Preston et al.

[11] 4,016,113
[45] Apr. 5, 1977

[54] USE OF SCHIFF BASES AS CROSS-LINKING AGENTS FOR HIGH RESILIENCE POLYURETHANE FOAM

[75] Inventors: Frank J. Preston, Meriden; John S. Babiec, Jr., Orange; Clifford J. Maxwell, Milford, all of Conn.

[73] Assignee: Olin Corporation, New Haven, Conn.

[22] Filed: Feb. 17, 1976

[21] Appl. No.: 658,234

[52] U.S. Cl. .................. 260/2.5 AM; 260/2.5 AC; 260/2.5 AP; 260/75 NH; 260/77.5 AM
[51] Int. Cl.² ..................................... C08G 18/14
[58] Field of Search ............... 260/2.5 AM, 2.5 AC, 260/75 NH, 77.5 AM, 2.5 AP

[56] References Cited

UNITED STATES PATENTS

| | | | |
|---|---|---|---|
| 3,321,433 | 5/1967 | Baumann | 260/75 NH |
| 3,657,192 | 4/1972 | Schulz et al. | 260/77.5 AM |
| 3,890,255 | 6/1975 | van Leuwen et al. | 260/2.5 AC |
| 3,907,721 | 9/1975 | Gurgiolo | 260/2.5 AM |
| 3,926,867 | 12/1975 | Quock et al. | 260/2.5 AM |

*Primary Examiner*—Eugene C. Rzucidlo
*Attorney, Agent, or Firm*—F. A. Iskander; T. P. O'Day

[57] ABSTRACT

Selected Schiff bases of aromatic and alkylsubstituted aromatic ortho diamines are employed as cross-linking agents in the preparation of high resilience polyurethane foam.

17 Claims, No Drawings

USE OF SCHIFF BASES AS CROSS-LINKING AGENTS FOR HIGH RESILIENCE POLYURETHANE FOAM

This invention relates to the preparation of flexible polyurethane foam. More particularly, the invention relates to an improvement in the preparation of high resilience polyether polyurethane foam.

Polyurethane foams are prepared by reacting polyols with organic polyisocyanates in the presence of a foaming agent and a reaction catalyst. A variety of polyether polyols have been used for this purpose including, for example, the products of condensing alkylene oxide with a polyhydroxy initiator having from 2 to 8 hydroxyl groups or a mixture of such initiators. Depending on the hydroxyl number of the polyether polyol used, the resulting foam can range in property from very flexible to completely rigid.

It is known, in the art of making flexible polyether polyurethane foam, that the use of highly reactive foam-forming formulations, incorporating a high-molecular-weight polyol having a certain level of primary hydroxy groups, yields a foam with improved resilience and other desirable physical properties. Such a foam has come to be referred to in the art as a "high resilience" foam.

Due to the highly reactive nature of the reaction mixture from which high resilience foams are prepared, such foams are characteristically unstable and will ordinarily succumb to substantial shrinkage or collapse shortly after the foaming reaction is completed. Therefore, to obviate or minimize this problem, a cross-linking agent is included in the foam-forming mixture to speed up the curing of the foam. Conventional cross-linking agents are the aromatic diamines, particularly the chlorinated aromatic diamines such as 4,4'-methylene-bis (2-chloroaniline).

However, the utility of these conventional cross-linking agents has been circumscribed by their toxicity, instability on prolonged storage and high cost. Thus a need exists in this art for alternative cross-linking agents which are more suitable, from an economic and practical standpoint, for use in the production of high resilience foam.

Now a new class of cross-linking agents has been found. According to the invention, the new cross-linking agents are Schiff bases represented by formula I as follows:

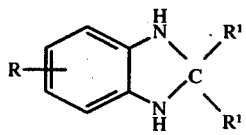

(I)

wherein

R is hydrogen or alkyl of 1–12 carbon atoms, and each
R' is independently an aliphatic hydrocarbon radical having 1–12 carbon atoms or the moiety

is an unsubstituted or alkyl-substituted cycloaliphatic radical having 5 or 6 ring carbon atoms, the alkyl substituent having 1–6 carbon atoms.

Further according to the invention, the Schiff bases of Formula I are used to advantage as cross-linking agents in the production of high resilience polyurethane foam. Such use, along with obviating the need for the conventional, highly toxic and relatively costly cross-linking agents, has been found to provide the added advantage of imparting improved properties to the resulting foam.

In the preparation of the polyurethane foams of the invention, either the so-called "one-shot method" or the "semiprepolymer technique" may be employed, the one-shot method being generally preferred. The polyurethane foam is prepared from a reaction mixture comprised of any combination of polyether polyols, as described hereinbelow, organic isocyanates, foaming agents, and reaction catalysts.

In order to achieve high resilience properties in the resulting foam, a polyether polyol reactant is used which is characterized by (1) a molecular weight of at least about 4,000 (2) a polyhydroxy alcohol nucleus, (3) polyoxyalkylene chain segments attached to the nucleus, and (4) a ratio of primary to secondary hydroxy groups ranging from about 1:5:1 to about 6:1. This polyether polyol can be prepared by methods generally well known in the art wherein, for example, a polyhydric alcohol initiator is condensed, in the presence of an alkaline catalyst, first with an alkylene oxide having 3 or more carbon atoms and then with ethylene oxide.

The polyhydric alcohol initiator which is used to prepare the polyol reactant can be any such compound having a functionability of 2–4, i.e., 2–4 hydroxy groups. Illustrative are ethylene glycol, propylene glycol, the butylene glycols such as 1,3-butylene glycol, the pentane diols such as 1,5-pentane diol, the hexane diols such as 1,6-hexane diol, glycerin, trimethylolpropane, triethylolpropane, pentaerythritol, mixtures thereof and the like. The most preferred initiators are the aliphatic triols such as glycerin and trimethylolpropane.

In preparing the polyol reactant, a polyhydric alcohol initiator as described above is sequentially condensed, in the presence of an alkaline catalyst such as potassium hydroxide, first with an alkylene oxide having 3–8, and preferably 3–4, carbon atoms and then with ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and in which polyether the ratio of primary to secondary hydroxy groups is from about 1.5:1 to about 6:1. Preferably, the polyether polyol has a molecular weight of about 4,500–7,500 and a ratio of primary to secondary hydroxyl groups ranging from about 2:1 to about 5:1. The most preferred polyol reactant is an oxypropylated then oxyethylated aliphatic triol having a molecular weight of about 5,600–6,600 and a ratio of primary to secondary hydroxy groups ranging from about 2:1 to about 4.5:1.

In preparing the foams of the invention, any suitable organic polyisocyanate, or a mixture of polyisocyanates, may be employed which is capable of readily reacting with a polyether polyol to form a polyurethane. Illustrative are toluene diisocyanate, such as the 80:20 and the 65:35 mixtures of the 2,4- and 2,6-isomers, ethylene diisocyanate, propylene diisocyanate, methylene-bis(4-phenyl isocyanate), 3,3'-bitoluene4,4'-diisocyanate, hexamethylene diisocyanate, mixtures thereof and the like. It is preferred however to employ toluene diisocyanate or a mixture thereof with a polymethylene polyphenylisocyanate. Illustrative polymethylene polyphenylisocyanates are those described in the U.S. Pat. No. 2,683,730.

The amount of polyisocyanate, including mixtures thereof, that is employed should generally be sufficient to provide at least 0.7 NCO group per hydroxy group in the reaction system, which includes the polyether polyols as well as any additional material and/or foaming agent present in the system. However, in practice such as proportion of polyisocyanate is usually employed as to provide no more than about 1.25, and preferably about 0.9–1.20, NCO groups per each hydroxy group. A 100 multiple of the ratio of NCO to OH groups in the reaction system is referred to as the "index".

Any suitable foaming agent, or mixture of foaming agents, may be employed in preparing the polyurethane foam. This includes inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight halogenated alkanes, such as monofluorotrichloromethane and dichlorodifluoromethane, are preferred, the use of water alone being most preferred. The amount of foaming agent may be varied within a reasonably wide range as is well known in the art. Generally, however, the halogenated alkanes, for example, are employed in an amount of about 2–30 parts per 100 parts by weight of the polyol. In accordance with the most preferred embodiments of the invention, relatively low density foam is prepared by utilizing, as the foaming agent, water in a proportion of about 1.5–5.0 parts per every 100 parts of polyether polyol.

The catalyst employed in preparing the foams of the invention may be any of the catalysts known to be useful for this purpose, including tertiary amines, mixtures thereof, organo-metallic salts, and mixtures of an organo-metallic salt with one or more tertiary amine. The preferred catalysts are those which are comprised of at least on tertiary amine. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexyl amine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and "Dabco 8020", respectively, and bis(methylaminopropylether). The preferred tertiary amine catalysts are triethylenediamine, mixtures of triethylene diamine with dipropylene glycol, mixtures of bis(dimethylaminoethylether) and dipropylene glycol and dimethylcyclohexylamine alone or as a mixture thereof with 2-(3-pentyl)-1-dimethylaminocyclohexane. The tertiary amine catalyst is usually used in a proportion of about 0.05–2.0, and preferably about 0.25–0.75, parts per 100 parts by weight of the polyol which is employed in preparing the foam.

Typical organo-metallic salts include for example the salts of tin, titanium, antimony, aluminum, cobalt, zinc, bismuth, lead, and cadmium, the tin salts, i.e., stannic and stannous salts, being preferred. Illustratively such salts include the octoates, dilaurates, diacetates, dioctoates, oleates, and neodeconates of these metals, the octoates being preferred. The organo-metallic salt catalyst is usually used in a proportion of up to about 1.0, and preferably about 0.05–0.2, parts per 100 parts by weight of the polyol which is employed in the preparation of the foam.

It is preferred in the preparation of the polyurethane foams of the invention to employ minor amounts of a conventional surfactant in order to further improve the cell structure of the polyurethane foam. Suitable such surfactants include for example, the silicon-based surfactants such as the silicones and the siloxaneoxyalkylene block co-polymers, all of which are commercially available materials. Generally the silicones are employed in a proportion of up to about 0.1 parts per 100 parts per weight of the polyol; and the siloxaneoxyalkylene block co-polymers are employed in a proportion of up to about 2 parts per 100 parts by weight of the polyol.

If desired various additives may be included in the foam forming reaction mixtures, which additives serve a certain function or provide a certain desirable property in the foam. This includes, for example, colorants, fire retardant additives and so forth.

Pursuant to the invention, a Schiff base of formula I is added to the foam-forming reaction mixture to serve as a cross-linking agent. As indicated above with reference to formula I, R can be hydrogen or alkyl 1–12 carbon atoms such as methyl, ethyl, propyl, butyl, pentyl, hexyl, octyl, decyl, and dodecyl. However, it is generally preferred to employ those Schiff bases of formula I wherein R is hydrogen or alkyl of 1–4 carbon atoms, those in which R is methyl being most preferred.

With respect to the radicals R' in formula I, each of those can be independently an aliphatic hydrocarbon radical. This includes alkyl radicals of 1–12, and preferably 1–4, carbon atoms, such as illustrated hereinabove in connection with the R radical, and alkenyl radicals of 2–12, and preferably 2–4 carbon atoms, such as vinyl, propenyl, butenyl and so forth. Alternatively, the moiety

can be an unsubstituted or alkyl-substituted cyclopentyl or cyclohexyl, the alkyl substitutent having 1–6 carbon atoms. In general, it is preferred to employ those Schiff bases of formula I wherein the R' radical are alkyl or

is unsubstituted or alkyl-substituted cyclopentyl or cyclohexyl.

Illustrative Schiff bases of formula I, wherein each R' represents an aliphatic hydrocarbon radical, include the following compounds. The names given are based on the conventional nomenclature as used in the Chemical Abstracts.
2,2-dimethyl benzimidazoline
2-methyl-2-ethyl benzimidazoline
2-methyl-2-propyl benzimidazoline
2-methyl-2-butyl benzimidazoline
2-methyl-2-hexyl benzimidazoline
2-methyl-2-decyl benzimidazoline
2,2-dimethyl-5-methylbenzimidazoline
2-methyl-2-butyl-6-methyl benzimidazoline
2,2-diethyl benzimidazoline
2,2-diethyl benzimidazoline
2-ethyl-2-hexyl benzimidazoline
2-methyl-2-isoamyl-5-methyl benzimidazoline
2,2-dioctyl benzimidazoline
2,2-didecyl benzimidazoline
2-propyl-2-pentyl benzimidazoline
2,2-diethyl-6-ethylbenzimidazoline
2,2-dipropyl-5-isopropylbenzimidazoline
2,2-dipropyl-5-methylbenzimidazoline
2,2-dibutyl-6-methylbenzimidazoline
2,2-dibutyl-6-dodecylbenzimidazoline
2-methyl-2-propenyl benzimidazoline
2-ethyl-2-propenyl-5-methylbenzimidazoline
2-methyl-2-butenyl benzimidazoline
2-ethyl-2-butenyl-6-methylbenzimidazoline
2,2-dihexyl benzimidazoline
2,2-dihexyl-5-methylbenzimidazoline Illustrative Schiff bases of formula I, wherein the moiety

is unsubstituted or alkyl-substituted cyclopentyl or cyclohexyl, include the following compounds. Here again the names given are based on conventional nomenclature as used in the Chemical Abstracts.
Spiro(benzimidazoline-2,1'-cyclopentane)
Spiro(benzimidazoline-2,1'-cyclohexane)
Spiro(5-methylbenzimidazoline-2,1'-cyclopentane)
Spiro(5-methylbenzimidazoline-2,1'-cyclohexane)
Spiro(6-methylbenzimidazoline-2,1'-cyclopentane)
Spiro(6-methylbenzimidazoline-2,1'-cyclohexane)
Spiro(5-isopropylbenzimidazoline-2,1'-cyclopentane)
Spiro(6-isobutylbenzimidazoline-2,1'-cyclohexane)
Spiro(5-pentylbenzimidazoline-2,1'-cyclohexane)
Spiro(6-octylbenzimidazoline-2,1'-cyclopentane)
Spiro(6-dodecylbenzimidazoline-2,1'-cyclohexane)
Spiro[benzimidazoline-2,1'-(2'-methyl)-cyclopentane]
Spiro[benzimidazoline-2,1'-(2'-methyl)-cyclohexane]
Spiro[benzimidazoline-2,1'-(3'-ethyl)-cyclohexane]
Spiro[benzimidazoline-2,1'-(4'-hexyl)-cyclohexane]
Spiro[5-methylbenzimidazoline-2,1'-(3'-methyl)-cyclopentane]
Spiro[6-methylbenzimidazoline-2,1'-(2'-ethyl)-cyclohexane]
Spiro[6-n-butylbenzimidazoline-2,1'-(3'-isopropyl)-cyclohexane]
Spiro[5-octylbenzimidazoline-2,1'-(2'-methyl)-cyclohexane]
Spiro[5-dodecylbenzimidazoline-2,1'-(3-isobutyl)-cyclohexane]

In accordance with a particularly preferred embodiment of the invention, Schiff bases of formula I are employed wherein R is methyl and the moiety

is unsubstituted or alkyl substituted cyclopentyl or cyclohexyl, the unsubstituted moieties being most preferred. Illustrative of these preferred bases are Spiro[5-methylbenzimidazoline-2,1'-cyclopentane], Spiro[5-methylbenzimidazoline-2,1'-cyclohexane], Spiro[6-methylbenzimidazoline-2,1'-cyclopentane], Spiro [6-methylbenzimidazoline-2,1'-cyclohexane] and mixtures thereof.

The Spiro Schiff bases of formula I can be prepared by methods well known in the art. See for example Chem. Ber., 1965, 98(8), page 2681. Thus they can be prepared by reacting an aromatic or aliphatic-aromatic ortho-diamine with a ketone, the latter being an aliphatic or cycloaliphatic ketone. The ortho- diamine reactant may be represented by the formula

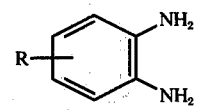

(II)

wherein R has the significance indicated above. Illustrative such ortho-diamines include ortho-phenylene diamine, the orthotoluene diamines, such as 2,3-toluene diamine and 3,4-toluene diamine, the ethyl phenylene ortho-diamines, the propyl phenylene ortho-diamines, the butyl phenylene ortho-diamines, the hexyl phenylene ortho-diamines, the octyl phenylene ortho-diamines, and so forth. It is to be noted that the aliphatic-aromatic ortho-diamine may be a single isomer of such a compound or it may be a mixture of two or more such isomers. As a specific example, the ortho-toluene diamines are usually provided in the form of a mixture of 2,3- and 3,4-isomers. Of course, where an isomeric mixture of an aliphatic-aromatic ortho-diamine reactant is used, the reaction product will correspondingly be an isomeric mixture of Schiff bases.

It is especially preferred to employ, as the ortho diamine reactant, ortho-toluene diamine. This is because ortho-toluene diamine, usually in the form of isomeric mixtures thereof, ia a readily available, inexpensive material. Thus it is obtained as a by-product of the commercial production of non-vicinal toluene diamines as used in making toluene diisocyanate. To this extent, the Schiff bases of formula I in which R is methyl represent an economically attractive group of cross-linking agents for use according to the invention.

The ketone reactant may be represented by the following formula wherein R' has the significance indicated above

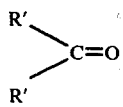

(III)

Illustratively, ketones of formula III include, for example, acetone, metylethyl ketone, methylpropyl ketone, methylbutyl ketone, methyloctyl ketone, methyldodecyl ketone, diethyl ketone, dipropyl ketone, dibutyl ketone, dihexyl ketone, dipentyl ketone, didecyl ketone, ethylpropyl ketone, ethylbutyl ketone, methylvinyl ketone, methylisopropenyl ketone, cyclopentanone, methylcyclopentanone, ethylcyclopentanone, hexylcyclopentanone, cyclohexanone, methylcyclohexanone, ethylcyclohexanone, propylcyclohexanone, and so forth.

Using approximately equi-molar proportions of ketone and ortho-diamine, the reaction is usually carried out under reflux conditions and in the presence of an inert organic solvent such as toluene, xylene or the like. This serves to azeotrope the water which is formed as a by-product and which is then removed from the reaction mixture. The reaction is completed when no more water is generated, whereupon the solvent is removed by evaporation, leaving a substantially pure product which is ready for use as a cross-linking agent.

In practicing the method of the invention for the preparation of high resilience polyurethane foam, the Schiff bases of formula I may be employed in any suitable proportion which is effective as a cross-linking agent without otherwise materially altering the basic properties of the foam or interfacing with the polyurethane foam-forming reaction. Thus the term "cross-linking amount", as used in the specification and claims herein, is intended to emcompass any such proportion. Illustratively, the cross-linking amount ranges from about 0.5 to about 10, preferably about 1-6, and more preferably about 2-5, parts per every 100 parts by weight of the polyol.

In the practice of this invention, a polyurethane foam-forming reaction mixture comprising the above-described ingredients is fed to a suitable reaction zone such as by pouring into the suitable mold or onto a moving conveyor belt where reaction proceeds. The foaming reaction is exothermic, and auxiliary heat is usually not necessary to effect the reaction, although it may be employed. After the reactants have been thoroughly mixed together, an emulsion or "cream" forms. As the temperature increases from the reaction, gas bubbles are generated bringing about the formation of a cellular material which, upon curing, is suitable for use in a variety of cushioning applications.

Foams prepared according to the invention cure rapidly and thus are not subject to substantial shrinkage or collapse. In addition, these foams, by virtue of the Schiff base cross-linking agent used in their preparation, are characterized by improved load bearing properties. Specifically, at relatively low foam densities, i.e., below about 3.5 pounds per cubic foot, they have an unexpectedly high SAC Factor. The "SAC" Factor is a measure of support provided by a cushioning material. In accordance with the test described in ASTM D-1564-64T, it is expressed as the ratio of indentation load deflection, ILD, at 65 percent to 25 percent deflection. Thus by having a high SAC Factor, the foams of the invention, while being quite flexible and soft at the surface, exhibit little or no tendency to bottom out; and this property is achieved in the foams of the invention in the absence of fillers or other expedients which might alter the basic properties of the foam. The foams of the invention are also characterized by high tear strength, tensile strength and elongation properties.

The following examples are provided to illustrate the invention. In these examples, all parts and percentages are by weight unless otherwise specified.

EXAMPLE 1

58 (0.6 mole) of cyclohexanone were mixed with 61 grams (0.5 mole) of ortho-toluene diamine. The latter consisted of approximately a 50/50 blend of 2,3- and 3,4-isomers. The mixture was dissolved in 300 mls. of toluene and thereafter placed in a round bottom flask fitted with a reflux condenser and a Dean Stark trap. The solution mixture was refluxed for 2 hours, the water formed being removed azeotropically. Thereafter the toluene was removed by vacuum distillation, leaving crude Schiff base product which weighed at 107 grams. This product was subjected to gas chromatography and mass spectrometry. The results of these tests indicated the following approximate composition:

10% — unreacted ortho-toluene diamine,
70% — isomeric mixture of Spiro(5-methylbenzimidazoline-2,1'-cyclohexane and Spiro(6-methylbenzimidazoline-2,1'-cyclohexane,
balance — unidentified components including about 12% of high boilers.

EXAMPLE 2

A flexible polyurethane foam was prepared from a reaction mixture which consisted of 3.4 parts of the crude Spiro Schiff base product of Example 1, as a cross-linker, and the following ingredients:

| Ingredients | Parts by weight |
|---|---|
| Polyether polyol[1] | 100.0 |
| Toluene diisocyanate (80/20 mixture of 2,4-/2,6-isomers) | (105 index) |
| Triethylene diamine catalyst composition[2] | 0.40 |
| Stannous octoate | 0.02 |
| Bis(2-dimethylaminoethyl) ether catalyst composition[3] | 0.10 |
| Water | 2.0 |
| Polydimethylsiloxane surfactant[4] | 0.05 |

[1]This is a 5803 molecular weight polyether triol prepared by the KOH catalyzed oxyalkylation of glycerin first with propylene oxide and then with 12.7 moles of ethylene oxide.
[2]This catalyst composition, purchased commercially under the trademark "Dabco 33-LV", consists essentially of ⅓ triethylene diamine and ⅔ dipropylene glycol.
[3]This catalyst composition, purchased commercially under the trademark "NIAX A-1", consists essentially of 70% bis(2-dimethylaminoethyl) ether and 30% dipropylene glycol.
[4]This surfactant was purchased commercially under the trademark "DC-200-5".

The above ingredients were mixed together and dispensed from a foaming machine into a square cardboard box. The foaming reaction took place instantly and was completed in less than 3 minutes. A uniform foam product was thus obtained which cured at room temperature without exhibiting any shrinkage or collapse. After measuring the core density of the foam, its physical properties were determined, namely, indentation load deflection properties and SAC Factor, tensile strength, tear strength and elongation. The latter three properties were determined in accordance with the test described in ASTM 1564-64. The tensile strength, expressed in pounds per square inch, is a measure of the minimum tension per unit cross-sectional area, which must be exerted on a standard foam sample to cause it to snap or break. The tear strength is expressed in pounds per linear inch, and this indicates the force necessary to cause a one-inch tear in a standard foam sample. Finally the elongation, which is expressed as a percentage of original length of the sample, is a measure of the length that the sample can be stretched to before it breaks or snaps. The result of all these determinations are provided in Table 1 below.

COMPARISON 1

The procedure of Example 2 was followed except for the exclusion of the Schiff base cross-linking agent. The resulting foam collapsed shortly after the foaming reaction was completed. This result demonstrates the need for a cross-linking agent when preparing high resilience polyurethane foam. Compared with the result of Example 2, it further demonstrates the effectiveness of the Schiff bases of the invention as cross-linkers and stabilizers for high resilience polyurethane foam.

COMPARISON 2

A flexible polyurethane foam was prepared using substantially the same procedure and formulation of Example 2. Here, however, instead of the Schiff base, 3.5 parts of a prior art cross-linking agent were used. The latter was a polyether polyol prepared by condensing, in the presence of boron trifluoride etherate catalyst, a mixture of 3 moles of anhydrous dextrose and 1 mole of glycerin with propylene oxide to an average hydroxyl number of 375. A uniform, stable foam was thus obtained. Its physical properties were tested as in Example 2, and the results are provided in Table 1 below.

Table 1

| Foam Physical Properties | Example 2 | Comparison 2 |
|---|---|---|
| Density (lbs./cu. ft.) | 2.88 | 2.84 |
| Indentation load Deflection (lbs.) | | |
| at 25% deflection | 27 | 25 |
| at 65% deflection | 66 | 57 |
| SAC Factor | 2.4 | 2.2 |
| Tensile Strength (lbs./sq. in.) | 16.0 | 14.0 |
| Tear Strength (lbs./linear in.) | 3.1 | 2.2 |
| Elongation(%) | 410 | 255 |

The data in Table 1 demonstrates the improvement in SAC Factor and other physical properties which is realized by using a cross-linking agent according to the invention as compared with the use of a prior art foaming agent.

EXAMPLE 3

The identical procedure of Example 2 was followed with the exception that in lieu of 2 parts water, 3 parts were used. The resulting foam exhibited no noticeable shrinkage or collapse and its physical properties are provided in Table 2 below.

COMPARISON 3

Again substantially the same procedure and formulation of Example 3 was used. Here, however, the prior art cross-linking agent described in Comparison 2 was used in the amount of 3.5 parts. The physical properties of the resulting foam are provided in Table 2 below.

Table 2

| Foam Physical Properties | Example 3 | Comparison 3 |
|---|---|---|
| Density (lbs./cu. ft.) | 1.9 | 2.2 |
| Indentation Load Deflection (lbs.) | | |
| at 25% deflection | 29 | 29 |
| at 65% deflection | 73 | 61 |
| SAC Factor | 2.5 | 2.1 |
| Tensile Strength (lbs./sq. in.) | 12.4 | 14.4 |
| Tear Strength (lbs./linear in.) | 2.7 | 1.9 |
| Elongation (%) | 285 | 218 |

EXAMPLE IV

A polyurethane foam was prepared as described in Example 2 except that the cross-linking agent used was a crude isomeric mixture of 2-methyl-2-isoamyl-5-methyl benzimidazoline and 2-methyl-2-isoamyl-6-methyl benzimidazoline. This mixture has been prepared following the general procedure of Example 1 except that 5-methyl hexanone-2 was used in lieu of the cyclohexanone. The resulting foam cured at room temperature without exhibiting any collapsing or shrinkage.

What is claimed is:

1. In a process for preparing a flexible high resilience polyurethane foam from a reaction mixture comprised of an organic polyisocyanate, a foaming agent, a reaction catalyst, and a polyether polyol reactant characterized by (1) a molecular weight of at least about 4,000, (2) a polyhydroxy alcohol nucleus having a functionability of 2–4, (3) polyoxyalkylene chain segments attached to said nucleus and (4) a ratio of primary to secondary hydroxy groups ranging from about 1.5:1 to about 6:1, the improvement which comprises including in said reaction mixture a crosslinking amount of a Schiff base represented by the formula:

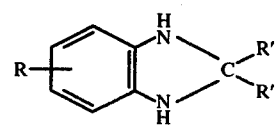

wherein
R is a hydrogen or alkyl or 1–12 carbon atoms, and each R' is independently an aliphatic hydrocarbon radical having 1–12 carbon atoms, or the moiety

is an unsubstituted or alkyl-substituted cycloaliphatic radical having 5 or 6 ring carbon atoms, the alkyl substitutent having 1–6 carbon atoms.

2. A polyurethane foam prepared by the process of claim 1.

3. The process of claim 1 wherein R is methyl.

4. The process of claim 3 wherein the moiety .

is cyclopentyl or cyclohexyl.

5. A polyurethane foam prepared by the process of claim 4.

6. The process of claim 1 wherein said polyether polyol is a triol having a molecular weight of about 4500–7500.

7. The process of claim 6 wherein said reaction mixture also comprise a silicon-based surfactant.

8. The process of claim 7 wherein said organic polyisocyanate is toluene diisocyanate or a mixture thereof with a polymethylene polyphenylisocyanate.

9. The process of claim 8 wherein said catalyst comprises at least one tertiary amine.

10. A polyurethane foam prepared by the process of claim 9.

11. The process of claim 9 wherein said foaming agent is water and said polyether triol has a molecular weight of about 5600–6600 and ratio of primary to secondary hydroxy groups ranging from about 2:1 to about 5:1.

12. The process of claim 1 wherein said cross-linking agent is employed in a proportion of about 1–6 parts per every 100 parts by weight of said polyether triol.

13. The process of claim 12 wherein R is hydrogen or alkyl of 1–4 carbon atoms.

14. The process of claim 13 wherein said polyether polyol is an oxypropylated then oxyethylated glycerin and said organic polyisocyanate is toluene diisocyanate.

15. The process of claim 14 wherein said catalyst comprises stannous octoate.

16. The process of claim 15 wherein R is methyl and the moiety

is cyclohexyl.

17. A polyurethane foam prepared by the process of claim 16.

* * * * *

UNITED STATES PATENT OFFICE
CERTIFICATE OF CORRECTION

Patent No. 4,016,113    Dated  April 5, 1977

Inventor(s)  Frank J. Preston, et al.

It is certified that error appears in the above-identified patent and that said Letters Patent are hereby corrected as shown below:

In Column 2, Line 25, the ratio "1:5:1" should read --1.5:1--.

In Column 3, Line 54, the word "on" should read --one--.

In Column 4, Lines 4-5, the term "bis(methylaminopropylether)" should read --bis(dimethylaminopropylether)--.

In Column 5, Line 25, the term "2,2-diethyl benzimidazoline", second appearance, should be omitted.

In Column 7, Line 36, the word "interfacing" should read --interfering--.

In Column 7, Line 48, the word "the" should be replaced with --a--.

In Column 8, Line 15, after "58" the word --grams-- should be added.

In Column 8, Line 24, after "leaving" the word --a-- should be added.

In Column 10, Line 24, the word "has" should read --had--.

UNITED STATES PATENT OFFICE
CERTIFICATE OF CORRECTION

Patent No. 4,016,113     Dated April 5, 1977

Inventor(s) Frank J. Preston et al.

It is certified that error appears in the above-identified patent and that said Letters Patent are hereby corrected as shown below:

Column 12, line 3, "claim 1" should be changed to correctly read -- claim 11 --.

Signed and Sealed this

Sixth Day of September 1977

[SEAL]

*Attest:*

RUTH C. MASON
*Attesting Officer*

LUTRELLE F. PARKER
*Acting Commissioner of Patents and Trademarks*